United States Patent
MacDonald et al.

(10) Patent No.: US 11,297,854 B1
(45) Date of Patent: Apr. 12, 2022

(54) COLORED BEVERAGE HAVING A NEUTRAL PH

(71) Applicant: GNT GROUP B.V., Mierlo (NL)

(72) Inventors: Jane Lee MacDonald, Mierlo (NL); Elena Leeb, Mierlo (NL)

(73) Assignee: GNT GROUP B.V., Mierlo (NL)

(*) Notice: Subject to any disclaimer, the term of this patent is extended or adjusted under 35 U.S.C. 154(b) by 0 days.

(21) Appl. No.: 17/423,624

(22) PCT Filed: Nov. 19, 2019

(86) PCT No.: PCT/EP2019/081840
§ 371 (c)(1),
(2) Date: Jul. 16, 2021

(87) PCT Pub. No.: WO2020/148005
PCT Pub. Date: Jul. 23, 2020

Related U.S. Application Data

(60) Provisional application No. 62/794,104, filed on Jan. 18, 2019, provisional application No. 62/794,074, (Continued)

(30) Foreign Application Priority Data

Feb. 11, 2019 (EP) .................... 19156394
Feb. 11, 2019 (EP) .................... 19156427
(Continued)

(51) Int. Cl.
*A23L 2/58* (2006.01)
*A23L 5/46* (2016.01)
(Continued)

(52) U.S. Cl.
CPC ............... *A23L 2/58* (2013.01); *A23L 2/44* (2013.01); *A23L 2/46* (2013.01); *A23L 5/46* (2016.08);
(Continued)

(58) Field of Classification Search
CPC . A23L 2/58; A23L 5/46; A23L 29/231; A23L 29/256; A23L 2/44; A23L 2/46; C12G 3/04; A23V 2002/00
(Continued)

(56) References Cited

U.S. PATENT DOCUMENTS

| 2011/0070336 A1 | 3/2011 | Mutilangi et al. |
| 2015/0201635 A1 | 7/2015 | Graf et al. |
| 2018/0271119 A1 | 9/2018 | Cagnac |

FOREIGN PATENT DOCUMENTS

WO       2018134390 A1    7/2018

OTHER PUBLICATIONS

Buchweitz, "Natural Solutions for Blue Colors in Food", Handbook on Natural Pigments in Food and Beverages, 2016, pp. 355-384, vol. 17, Woodhead Publishing.
(Continued)

*Primary Examiner* — Helen F Heggestad
(74) *Attorney, Agent, or Firm* — Hudak, Skunk & Farine Co. LPA

(57) ABSTRACT

A liquid foodstuff comprising a. a *spirulina*-extract comprising phycocyanin, b. at least one multi-sulphated carageenan and/or pectin c. a chelating agent d. a solvent, wherein the amount of multi-sulphated carrageenan and/or pectin is between 0.003 and 0.6 wt %, wherein the weight ratio between multi-sulphated carrageenan and/or pectin and phycocyanin ranges between 1:1 and 100:1, wherein the chelating agent is present between 1-2000 ppm, wherein the solvent consists of water and optionally ethanol, wherein the amount of solvent ranges between 60-99 wt %, wherein the wt % are relative to the total weight of the liquid foodstuff.

17 Claims, 1 Drawing Sheet

Related U.S. Application Data filed on Jan. 18, 2019, provisional application No. 62/794,094, filed on Jan. 18, 2019, provisional application No. 62/794,083, filed on Jan. 18, 2019.

(30) Foreign Application Priority Data

Feb. 11, 2019 (EP) .................................... 19156440
Feb. 11, 2019 (EP) .................................... 19156444

(51) Int. Cl.
*A23L 2/46* (2006.01)
*A23L 29/256* (2016.01)
*A23L 29/231* (2016.01)
*C12G 3/04* (2019.01)
*A23L 2/44* (2006.01)

(52) U.S. Cl.
CPC ........... *A23L 29/231* (2016.08); *A23L 29/256* (2016.08); *C12G 3/04* (2013.01); *A23V 2002/00* (2013.01)

(58) Field of Classification Search
USPC ........ 426/250, 573, 575, 577, 652, 655, 520
See application file for complete search history.

(56) References Cited

OTHER PUBLICATIONS

Singh, "Kinetics of acid hydrolysis of κ-carrageenan as determined by molecular weight (SEC-MALLSRI), gel breaking strength, and viscosity measurements", Carbohydrate Polymers, 1994, pp. 89-103, vol. 23, Elsevier Science Limited.

Yoshikawa, "Single-Laboratory Validation of a Method for the Determination of c-Phycocyanin and Allophycocyanin in Spirulina (Arthrospira) Supplements and Raw Materials by Spectrophotometry", Journal of AOAC International, 2008, pp. 524-529, vol. 91, No. 3.
Selig Michael J et al: Protection of blue color in a spirulina derived physocyanin extract from proteolytic and thermal degradation via complexation with beet-pectin, Food Hydrocolloids, Jul. 28, 2017, pp. 46-52, vol. 74, Elsevier BV, NL.
Eko Nuracahya et al: Physical Properties of Spirulina Phycocyanin Microencapsulated with Maltodextrin and Carrageenan, Philippine Journal of Science, Jun. 1, 2018, pp. 201-207, vol. 147, Philippines.
Ratana Chaiklahan et al.: Stability of phycocyanin extracted from *Spirulina* sp: Influence of temperature PH and preservatives, Process Biochemistry, Apr. 1, 2012, pp. 659-664, vol. 47, No. 4 Elsevier Ltd.
Giulia Martelli et al: "Thermal stability improvement of blue colorant C-phycocyanin from Spirulina platensis for bod industry applicators", Process Biochemistry, Jan. 1, 2014, pp. 154-159, vol. 49 No. 1, Elsevier Ltd.
Prajapativipul D et al: "Carrageenan: A natural seaweed polysaccharide and its applications", Carbohydrate Polymers, Jan. 30, 2014, pp. 97-112, vol. 105, Elsevier Ltd.
Jespersen et al: "Heat and light stability of three natural blue colorants for use in confectionery and beverages", European Food Research and Technology, Springer Berlin Heidelberg, Mar. 1, 2005, pp. 261-266 vol. 220, No. 304, Springer-Verlag.
Sonda Benelhadj et al: "Effect of pH on the functional properties of Arthrospira (Spirulina) platensis protein solate". Food Chemistry, Aug. 31, 2015, pp. 1056-1063, vol. 194, Elsevier Ltd.
Dewi et al:"Physical Characteristics of Phycocyanin from Spirulina Microcapsules using Different Coating Materials with Freeze Drying Method", 2nd Int'l Conf. Tropical and Coastal Region Eco Dev., 2016, IOP Conf Series: Earth and Envirn. Sci 55, 2017, 012060, IOP Publishing Ltd.

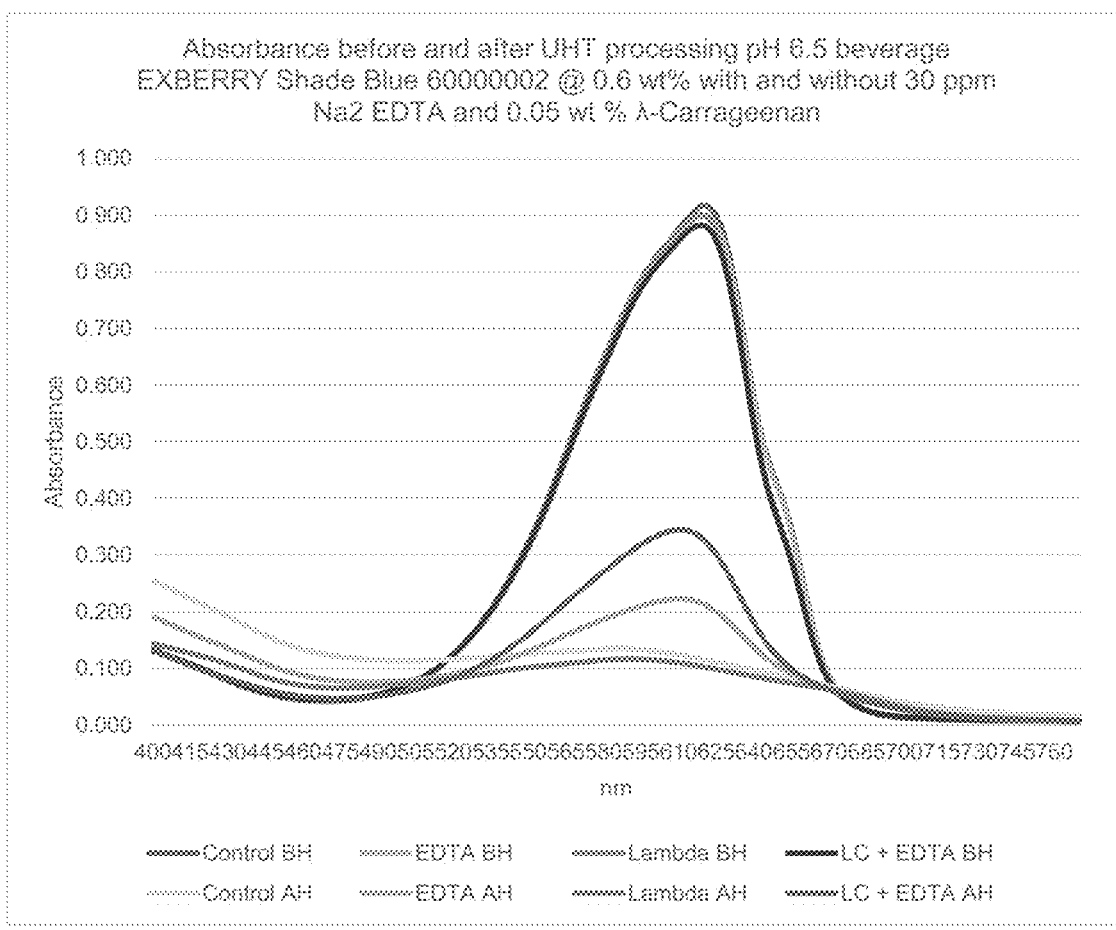

COLORED BEVERAGE HAVING A NEUTRAL PH

FIELD OF THE INVENTION

The present invention relates to a color stabilized liquid foodstuff containing a phycocyanin from *spirulina*-extract.

BACKGROUND OF THE INVENTION

Beverages and colored beverages are known in the art. The use of natural food pigments over synthetic ones has increased in the food industry, due to increased consumer demands. While several natural pigments have been applied to low acid beverages, having a pH greater than 4.6, there is a need for a stable blue pigment which can be used on its own or blended with other pigments to deliver a range of colors including but not limited to green, purple, brown, and black.

US2018271119 discloses the use of phycocyanin derived from *Galdieria sulphuraria*, which is capable of growing at both high temperature and low pH, for use in beverages. The increased acid stability of phycocyanin (and allophycocyanin) extracted from *Galdieria sulphuaria* might be explained by the differences in the amino acid sequence in comparison to phycocyanin from commercially available *spirulina* (such as *Arthrospira platensis, Arthrospira maxima*, ect.). But *Galdieria sulphuraia* phycocyanin extracts have not yet been approved or undergone long term testing, as *Spirulina* derived phycocyanin has.

Selig, et at discloses the use of beet-pectin to stabilize phycocyanin from a *Spirulina*-extract at pH 6.8 in an aqueous solution. Beet-pectin appears to be effective at pH 6.8, but is not stable upon thermal treatment, up to 120'C which is common in the food industry.

Dewi, et al. discloses a *spirulina*-extract encapsulated in κ-carrageenan for use in an aqueous solution.

Phycocyanin, from a *Spirulina*-extract, is to-date the only natural blue pigment approved by the US-FDA (FR Doc No: 2013-19550) and European Union as a coloring food. It is sold in liquid or in powder form for use as blue pigment in foods. Phycocyanin, however, has the disadvantage of being unstable in aqueous systems between pH 2.7-6 where protein aggregation occurs, and also instable under thermal treatment, leading to loss of color which limits the use of phycocyanin in low acid foodstuffs. Thus, phycocyanin has limited use for its food coloring properties in beverages, such as in for example non-alcoholic and alcoholic drinks, which have a pH greater than 4.6. Health conscious customers demand a wide range of naturally colored beverages, and phycocyanin is to-date the only available natural blue pigment. Hence, there is a need to stabilize phycocyanin when used in beverages which undergo thermal treatment or in cold filled alcoholic beverages.

SUMMARY OF THE INVENTION

The inventors have found a solution to stabilize the blue color, from a phycocyanin containing *spirulina*-extract, in liquid foodstuffs.

The present invention relates to a liquid foodstuff comprising
  a. a *spirulina*-extract comprising phycocyanin,
  b. at least one multi-sulphated carrageenan and/or pectin
  c. a chelating agent
  d. a solvent, wherein the amount of multi-sulphated carrageenan and/or pectin is between 0.003 and 0.6 wt %,
  wherein the weight ratio between multi-sulphated carrageenan or pectin and phycocyanin ranges between 1:1 and 100:1,
  wherein the chelating agent is present between 1-2000 ppm,
  wherein the solvent consists of water and optionally ethanol,
  wherein the amount of solvent ranges between 60-99 wt %,
  wherein the wt % are relative to the total weight of the liquid foodstuff.

The liquid foodstuff according to the invention has an increased color stability over the heating process as well as storage duration. The negative effects are aggregation/precipitation, color fading, color hue changes and lack of stability over time (weeks or months), as foodstuffs need to withstand long transport and varying storage conditions.

Advantages of the liquid foodstuff according to the invention are color stability and prevention of aggregation/precipitation; thereby enabling beverages to be naturally colored; for example, in blue and blue-based colors.

BRIEF DESCRIPTION OF THE DRAWINGS

FIG. 1: Absorbance spectra of aqueous liquid foodstuff at pH 6.5 before and after UHT processing (135° C. for 6 seconds) with and without λ-carrageenan and EDTA. The combination of λ-carrageenan with $Na_2$ EDTA had the best color retention post thermal processing.

DETAILED DESCRIPTION OF THE INVENTION

The liquid foodstuff of the invention contains multi-sulphated-carrageenan and/or pectin, a phycocyanin containing *spirulina*-extract and a chelator, preferably at a pH between 4.6 and 8.

The liquid foodstuff may further contain other components like for example sweeteners, stabilizers, chelating agents, acids, proteins, salts, flavors, vitamins, minerals, pigments, and preservatives.

The liquid foodstuff may have a blue color due to the phycocyanin content, but other colors based on blue may be obtained by way of mixing other pigments in with the liquid foodstuff. The liquid foodstuff may contain other pigments, such as safflomin (safflower), anthocyanin, carotenoid, betanin, annatto, lycopene, curcumin and chlorophyll. The pigments may be added to the blue colored phycocyanin containing liquid foodstuff to blend into other colors, such as for example green using safflomin.

The liquid foodstuff may contain additives and/or preservatives, such as salts, sorbic acid, salt of sorbate, benzolic acid, salt of benzoate, sodium hexametaphosphate, natamycin, nisin and sulfites.

The liquid foodstuff preferably has a solvent content of 60-99 wt %, more preferably between 75-98 wt %, most preferably between 83-97 wt %. The solvent consists of water and optionally ethanol (ethylalcohol). When ethanol is present typically, the liquid foodstuff contains between 0.1-20 wt % k, preferably between 0.5-17 wt %, more preferably between 1-15 wt %, most preferably between 3-10 wt % ethanol.

The wt % is defined as the weight % of a component relative to the total weight of the liquid foodstuff, unless defined otherwise.

Preferably the liquid foodstuff is a beverage, such as a coconut water, alkaline water, coffee beverages, fruit or vegetable drink, smoothie, dairy beverage, dairy alternatives, nut milks, nutritional drink, and/or alcoholic beverage.

The liquid foodstuff's color can be required to be stable over a long period of time (through transport and storage over weeks or months), at pH greater than 4.6. The color also needs to be stable after the liquid food product is subject to high temperature, up to 120° C., as these temperatures are commonly used in the food industry in processes such as high temperature short time pasteurization to ensure food safety.

Phycocyanin

The liquid foodstuff contains a phycocyanin containing *spirulina*-extract.

The phycocyanin containing *spirulina*-extract can be a water extract of for example *Arthrospira platensis* and *Arthrospira maxima*. *Spirulina* is a cyanobacteria that contains carbohydrates, lipids, fiber, minerals and amongst other proteins, phycobiliproteins. The phycobiliproteins comprise of C-phycocyanin and allophycocyanin. Phycocyanins exhibit the blue color of the liquid foodstuffs according to the present invention. The total phycocyanin content (which is the sum of the C-phycocyanin and allophycocyanin) in phycocyanin containing *spirulina*-extracts may vary by manufacturers and may typically range from 0.7-45.0 wt %. It is also possible to apply higher concentrations of phycocyanins. The phycocyanin containing *spirulina*-extract may also be known as *Spirulina* color concentrate, as for example EXBERRY® Shade Blue Powder. The phycocyanin containing *spirulina*-extract may be in liquid or dry (powder or granule) form and may contain diluents such as water, invert sugar, sucrose, and/or maltodextrin as example. For use in this invention, liquid and dry forms of phycocyanin containing *spirulina*-extract are applicable.

The liquid foodstuff preferably contains a dissolved phycocyanin from a *spirulina*-extract.

Multi-Sulphated Carrageenan

The liquid foodstuff contains a multi-sulphated carrageenan or combination of multi-sulphated carrageenan.

The liquid foodstuff preferably contains dissolved multi-sulphated carrageenan. Carrageenans are viewed as dissolved, when an aqueous solution is clear to the eye, and does not show sediment or floating particulates.

Carrageenans are sourced from seaweed and they are highly flexible molecules that can form curling helical structures. Carrageenans are characterized as linear polysaccharides with repeating galactose units.

Carrageenans are classified by the degree of sulfonation. Examples of mono-sulphated carrageenans are κ-carrageenan, γ-carrageenan and α-carrageenan. Examples of di-sulphated carrageenans are ι-carrageenan, δ-carrageenan, μ-carrageenan and θ-carrageenan. Examples of tri-sulphated carrageenans are λ-carrageenan and ν-carrageenan.

Multi-sulphated carrageenans are carrageenans containing at least 2 sulphate groups, preferably 2 or 3 sulphate groups per disaccharide unit.

In some embodiments the multi-sulphated carrageenan can be a non-degraded carrageenan In some embodiments the multi-sulphated carrageenan can be a hydrolyzed multi-sulphated carrageenan preferably by thermal treatment of a non-degraded multi-sulphated carrageenan under acidic pH conditions.

Thermal treatment of carrageenan solutions at acidic pH leads to a hydrolysis of the glycosidic bonds ($\alpha$(1-3) and $\beta$(1-4) bonds) connecting the alternating D-galactose residues. Thus, the average molecular weight was shown to decrease with increasing hydrolysis duration (Singh & Jacobsson, 1994). In addition, a good correlation of the measured viscosity and the molecular weight was observed, meaning that with decreasing molecular weight the viscosity decreases (Singh & Jacobsson, 1994). Preferably the pH is between 1.4 and 4 for hydrolysis of the glycosidic bonds, and preferably the temperature is between 20-98° C. for hydrolysis of the glycosidic bonds, more preferably between 55 and 98° C.

Due to the uniform backbone structure, the concentration of carrageenan can be quantified by the content of galactose. In addition, the quantification of galactose allows to determine if the glyosidic bond or also the galactose monomer unit gets degraded by the hydrolysis conditions.

A possibility to quantify galactose is the quantification of monosaccharides after acid hydrolysis. Hydrolysis of carrageenan is performed with 72% sulphuric acid ($H_2SO_4$) for 30 min at 30° C., followed by further hydrolysis after dilution to 6% sulphuric acid ($H_2OS_4$) for 3 hours at 100° C. The amount of monosaccharides rhamnose, galactosamine, arabinose, glucosamine, galactose, glucose, mannose, xylose, galacturonic acid and glucuronic acid in the hydrolysate can be quantitatively analyzed by High Performance Anion Exchange Chromatography with Pulsed Amperometric Detection (HPAEC-PAD) on a gold electrode. Analyses are performed with an ICS-5000 DP pump, AS-AP autosampler, DC column compartment and ED electrochemical detector (Thermo Scientific). The neutral monosaccharides are eluted using a gradient of 18 mM sodium hydroxide and 200 mM sodium hydroxide with 75 mM sodium acetate. Data analysis is done with Chromeleon software version 7.2 (Thermo Scientific). Quantitative analyses are carried out using standard solutions of the monosaccharides (Sigma-Aldrich).

Analysis of galactose content of the used lambda carrageenan powders shows a galactose content of 50-55 wt %.

Quantification of the galactose content in hydrolyzed carrageenan solutions showed comparable galactose contents as related to the initial amounts of used carrageenan powder. These results demonstrate that a hydrolysis of carrageenan at pH ≥1.5 and temperatures ≤ 95° C. result in the hydrolysis of the glycosidic bonds but do not degrade the galactose unit itself.

In addition, the degree of sulphonation can be quantified by the amount of Sulphur. A possibility to quantify Sulphur is based on the combustion of the sample at temperatures above 1000° C. and reduction of the released Sulphur to Sulphur dioxide (Elementar Vario Max Cube). The amount of Sulphur is quantified by an IR detector which is calibrated using a calibration curve of sulfadiazine.

The viscosity of the carrageenan solutions was characterized by viscometry. Viscosity measurements were taken using an Anton Paar Rheometer MCR 302 (Switzerland). Flow curves were measured with a shear rate (1/s) range from 1 to 300 at 20° C. To compare different carrageenan solutions, the viscosity at a shear rate of 100/s is used.

The preferred multi-sulphated carrageenans of the invention are ι-carrageenan, δ-carrageenan, μ-carrageenan, θ-carrageenan, λ-carrageenan and ν-carrageenan, the hydrolysed products of ι-carrageenan, δ-carrageenan, μ-carrageenan, θ-carrageenan, λ-carrageenan and ν-carrageenan; more preferred are ι-carrageenan and λ-carrageenan, and its hydrolyzed products and most preferred is λ-carrageenan and hydrolyzed λ-carrageenan.

Mixtures of multi-sulphated carrageenans can also be used.

The multi-sulphated carrageenans to be used in the present invention have preferably a viscosity between 1 and 3000 mPas, when dissolved as a 4 wt % solution in water at a pH of 5.5.

The multi-sulphated carrageenan content of the liquid foodstuff is between 0.003-0.6 wt %, preferably between 0.01-0.5 wt %, more preferably between 0.02-0.3 wt %, most preferably 0.03-0.2 wt %.

The dissolved multi-sulphated carrageenans and phycocyanin from a *spirulina*-extract are preferably present within the liquid foodstuff at a weight ratio between 1:1-100:1, preferably between 2:1-50:1, more preferably between 3:1-25:1, most preferably between 4:1-15:1.

Pectin

Instead of using a multi-sulphated carrageenan, it is also possible to apply pectin to stabilize the phycocyanin in combination with a chelator. Pectin is a heteropolysaccharide contained in the primary cell walls of plants. It is generally used as a stabilizer, gelling agent, or thickener in foodstuff. Pectins are classified as high-methoxy (HM) or low-methoxy (LM). The degree of methylation determines the classification. High methoxy pectins contain more than 50% of the carboxyl groups are methylated and less than 50% methylation are called low methoxy (LM) pectins. HM-pectins can form a gel under acidic conditions in the presence of high sugar concentrations, while LM-pectins form gels by interaction with divalent cations, particularly $Ca^{2+}$. The chemical composition of pectin varies based upon source material with most common materials being citrus peels, apple pomace, and sugar beet pulp. Regardless of source materials and degree of methylation pectins are applicable to stabilize phycocyanin at neutral pH and processing temperature greater than 80° C. when used in combination with a chelator.

The use of pectin in combination with a chelator shows an unexpected synergistic effect of color stability upon heat treatment.

The pectin content of the liquid foodstuff is between 0.003-0.6 wt %, preferably between 0.01-0.5 wt %, more preferably between 0.02-0.3 wt %, most preferably 0.03-0.2 wt %.

The dissolved multi-sulphated carrageenans and/or pectin and phycocyanin from a *spirulina*-extract are preferably present within the liquid foodstuff at a weight ratio between 1:1-100:1, preferably between 2:1-50:1, more preferably between 3:1-25:1, most preferably between 4:1-15:1.

Color

The color performance is assessed using a spectrophotometer and measuring absorbance at 620, 650 and 750 nm. The standard method for phycocyanin determination was established by Yoshikawa & Belay (2008) to calculate the native phycocyanin content (mg/mL) from photometric measurements. It relies upon absorbance measurements at 620 and 650 nm and the extinction coefficients of C-phycocyanin and allophycocyanin at these wavelengths at pH 6.0.

The phycocyanin content in a *spirulina*-extract is calculated using Yoshikawa & Belay (2008)method at pH 6.0 which is listed below.

$$\text{allophycocyanin}\left(\frac{\text{mg}}{\text{mL}}\right) =$$
$$0.180(\text{Abs } 650 \text{ nm} - \text{Abs } 750 \text{ nm}) - 0.042(\text{Abs } 620 \text{ nm} - \text{Abs } 750 \text{ nm})$$

$$C-\text{phycocyanin}\left(\frac{\text{mg}}{\text{mL}}\right) =$$
$$0.162(\text{Abs } 620 \text{ nm} - \text{Abs } 750 \text{ nm}) - 0.098(\text{Abs } 650 \text{ nm} - \text{Abs } 750 \text{ nm})$$

$$\text{Total Phycocyanin}\left(\frac{\text{mg}}{\text{mL}}\right) =$$
$$\text{allophycocyanin}\left(\frac{\text{mg}}{\text{mL}}\right) + C-\text{phycocyanin}\left(\frac{\text{mg}}{\text{mL}}\right)$$

To determine the amount of phycocyanin added to a liquid foodstuff, the dosage level of phycocyanin containing *spirulina*-extract is multiplied by the total phycocyanin content in the phycocyanin containing *spirulina*-extract.

The phycocyanin content of the liquid foodstuff is preferably between 0.003-0.07 wt %, preferably 0.006-0.05 wt %, and most preferably 0.008-0.04 wt %.

The challenge with phycocyanins is the stability during or after thermal treatment, which can lead to color loss and precipitation. Precipitation occurs in the pH range of 2.7-6.0 and for low acid foodstuff the critical range is between 4.6-6.0. Precipitation can be avoided when the pH is above 6.0 or delayed when the solution is in a gel or semi-solid form. The aggregation/precipitation is assessed visually. High absorbance at 750 nm after blending or thermal processing indicates a strong potential for protein aggregation.

Preferably the pH of the beverage according to the invention is between 4.6-10, more preferably between 5-9, most preferably between 5.5-8.

Chelators

The liquid foodstuff contains at least one chelator, which may also be referred to as chelating agents.

Chelators are binding agents that influence the chemical and/or physical state of the molecules/atoms they bind by forming chelates. Chelators can improve color retention and have been found to work synergistically with the multi-sulphated carrageenans and pectin.

Chelating agents can be synthetic and natural compounds and include the group of ethylene diamine tetra acetic acid and/or its Na, K, Ca salts (EDTA), L-glutamic acid N,N-diaceticacid tetrasodium salt (GLDA), galactaric acid, sodium hexametaphosphate, glutathione, metallotheionein, 2,3-dimerapto-1-propanesulfonic acid, *chlorella*, garlic, cilantro, selenium, milk thistle, vitamin C, vitamin E, citrates, grape seed extract, quercetin, and lipoic acid.

The chelating agents are preferably selected from the group of ethylene diamine tetra acetic acid and/or its Na, K, Ca salts (EDTA) and L-glutamic acid N,N-diaceticacid tetrasodium salt (GLDA). EDTA is considered to be ethylene diamine tetra acetic acid together with its Na, K, Ca salts, like for example calcium disodium ethylenediaminetetraacetate, disodium ethylenediaminetetraacetate, tetrasodium ethylenediaminetetraacetate, dipotassium ethylenediaminetetraacetate, and tripotassium ethylenediaminetetraacetate.

Calcium disodium ethylenediaminetetraacetate is abbreviated to $CaNa_2$ EDTA, disodium ethylenediaminetetraacetate is abbreviated to $Na_2$ EDTA, tetrasodium ethylenediaminetetraacetate is abbreviated to $Na_4$ EDTA, dipotassium ethylenediaminetetraacetate is abbreviated to $K_2$ EDTA, and tripotassium ethylenediaminetetraacetate is abbreviated to $K_3$ EDTA.

The chelating agent is preferably present between 1-2000 ppm in the liquid foodstuff.

1 ppm of chelating agent is to be understood as 0.0001 wt %; for example, 30 ppm of EDTA are 0.003 wt %.

EDTA is preferably present between 1-100 ppm, preferably 10-50 ppm, most preferably 20-40 ppm.

The EDTA and phycocyanin from a *spirulina*-extract are preferably present within the liquid foodstuff at a weight ratio between 2:1-1:300, preferably between 1:1-1:25, most preferably 1:2-1:15.

The multi-sulphated carrageenans and/or pectin in combination with a chelator such as EDTA showed a surprisingly high increase in color retention and extended shelf life after thermal treatment and/or in the presence of ethyl alcohol at neutral pH.

In an embodiment the liquid foodstuff is a beverage comprising between 0.003-0.6 wt % of λ-carrageenan, between 0.003-0.07 wt % of phycocyanin from a *spirulina*-extract and a chelating agent, wherein the weight ratio of λ-carrageenan to phycocyanin from a *spirulina*-extract is between 1:1-100:1. Preferably the chelating is EDTA. More preferably the chelating agent EDTA is present in an amount between 1 and 100 ppm.

In an embodiment the liquid foodstuff is a beverage comprising between 0.01-0.5 wt % of λ-carrageenan, phycocyanin from a *spirulina*-extract and a chelating agent and wherein the weight ratio of λ-carrageenan to phycocyanin from a *spirulina*-extract is between 2:1-50:1. Preferably the chelating agent is EDTA present in an amount from 10-50 ppm. Preferably the pH is between 4.6-10.

Process

Liquid foodstuffs are typically transported and stored before being consumed. To assure that these liquid foodstuffs do not spoil and are safe for consumption, thermal processes such as retort or UHT (Ultra High Temperature) are used for shelf stable low acid foodstuff. Pasteurization (73° C. for 15 seconds) or High Pressure Processing (300-600 MPa) may be used for refrigerated short shelf life products (60 days). Liquid foodstuffs can also be preserved through water activity and alcohol content. Preservatives may be added for additional microbiological control.

A considerable blue color loss is observed upon UHT processing (137° C. for 6 seconds) for low acid foodstuffs.

The multi-sulphated carrageenans and/or pectin in combination with a chelator such as EDTA showed a surprisingly high increase in color retention and extended shelf life after thermal treatment and/or use of preservatives.

The liquid foodstuff can be obtained according to a process comprising the following steps:
a) Adding and dissolving the multi-sulphated carrageenans and/or pectin in water and mixing until the multi-sulphated carrageenans and/or pectin are dissolved, as determined by visual observation.
b) Adding the phycocyanin containing *spirulina*-extract, and mixing until dissolved at a pH of at least 5, preferably between 5 and 10;
c) Adding a chelating agent, such as EDTA;
d) Optionally adding a sweetener, flavor, vitamin, mineral, salt, buffer, juice, or other beverage components;
e) Optionally adding other pigments, such as anthocyanins;
f) Adding solvents to obtain the total volume, such as water and alcohol;
g) Treating the mixture of a)-f) by either thermally processing the liquid to at least 65° C. and filling it into a container; filling the liquid into a container and thermally processing the filled package to at least 100° C. or no thermal treatment and cold filling into a container and controlling by formulation (alcohol or water activity), addition of preservatives or high pressure.

The multi-sulphated carrageenans can be hydrolyzed with heat and acid to reduce viscosity and neutralized to a pH of at least 5.0 before blending with phycocyanin in step a).

The phycocyanins, multi-sulphated carrageenans and/or pectin, and EDTA are preferably dissolved in the liquid feedstock. Dissolved means that the phycocyanins, carrageenans and/or pectin, and EDTA stay in the solution. The solution is clear to the eye and no sediment or floating particles are observed.

Multi-sulphated carrageenan and/or pectin can be dry blended with a non-acidic carbohydrate such as sucrose or maltodextrin to improve dissolution of the multi-sulphated carrageenan.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

REFERENCES

Buchweitz, M. (2016). 17—Natural Solutions for Blue Colors In Food. In R. Caude, & R. M. Schweiggert (Eds.). *Handbook on Natural Pigments in Food and Beverages* (pp. 355-384): Woodhead Publishing.

Dewi, E. N. et al. 2017, "Physical characteristics of phycocyanin from *Spirulina* microcapsules using different coating materials with freeze drying method", IOP *Conf. Ser.: Earth Environ. Sci.* 55.

Selig, M. J., et al., (2017), "Protection of blue color in a *spirulina* derived phycocyanin extract from proteolytic and thermal degradation via complexation with beet-pectin", *Food Hydrocolloids*.

Singh, Satish K. and Jacobsson, Sven P. (1996). Kinetics of acid hydrolysis of κ-carrageenan as determined by molecular weight (SEC-MALLSRI), gel breaking strength, and viscosity measurements. *Carbohydrate Polymers*. 23, 89-103.

Yoshikawa & Belay (2008) Yoshikawa, N., & Belay, A. (2008). Single-Laboratory Validation of a Method for the Determination of c-Phycocyanin and Allophycocyanin in *Spirulina* (*Arthrospira*) Supplements and Raw Materials by Spectrophotometry. *Journal of AOAC International*, 91, 524-529.

EXAMPLES

Experiment 1
Experiment 1.1

Various hydrocolloids were investigated to determine which ones prevented phycocyanin aggregation in an aqueous solution near the isoelectric point of *spirulina* proteins, ~pH 4.0. Seven hydrocolloids were tested at a dosage level of 0.05 wt % in a 7 wt % sucrose solution at pH 4.0 with EXBERRY® Shade Blue Powder 60000002 phycocyanin containing *spirulina*-extract at 0.5 wt % (equating to 0.012 wt % phycocyanin). The beverage solution was thermally processed to 85° C. (microwave) and filled hot into PET bottles and cooled in a water bath to less than 35° C.

*Spirulina* aggregation occurred in control, K-carrageenan, and guar gum. No precipitation occurred in lambda carrageenan, iota carrageenan, HM pectin (citrus and apple), xanthan, and gum acacia. (see table 1).

TABLE 1

Aggregation of spirulina proteins in aqueous solution after thermal processing at pH 4

| Control | λ-carrageenan | I-carrageenan | K-carrageenan | HM Pectin (citrus/apple) | Xanthan | Gum Acacia | Guar Gum |
|---|---|---|---|---|---|---|---|
| Yes | No | No | Yes | No | No | No | Yes |

Experiment 1.2

To expand upon learnings in experiment 1.1, seven hydrocolloids were tested at a dosage level of 0.05 wt % in a 7 wt % sucrose solution at pH 6.5 with EXBERRY® Shade Blue Powder 60000002 at 0.5 wt % (equating to 0.0117 wt % phycocyanin) to determine if color retention is improved. Trisodium citrate or citric acid was added to the final solution to adjust the pH to 6.5. The beverages were processed to 135° C. for 6 seconds and filled at ambient temperature into sterile bottles as the product is low acid and the higher temperatures are needed to control for pathogens.

Total phycocyanin content was determined before and after processing. The Yoshikawa & Belay (2008) method was modified and instead of diluting the sample to adjust pH to 6.0, the solution was measured as is at pH 6.5.

No aggregation or precipitation was observed after thermal processing at pH 6.5, however, color loss was significant >85% after thermal processing for the control sample (no hydrocolloid) and all seven hydrocolloids. In experiment 1.2 no chelating agents were present.

Table 2 shows the total phycocyanin content of the control sample and with the addition of seven different hydrocolloids before and after processing and whether any precipitation was observed.

TABLE 2

Precipitation and total phycocyanin (PC) content before and after UHT thermal processing at pH 6.5.

| | Total PC (mg/mL) Before Heat | Total PC (mg/mL) After Heat | % Loss after heating | Precipitation |
|---|---|---|---|---|
| Control | 0.117 | 0.016 | 86% | No |
| Λ-carrageenan | 0.114 | 0.016 | 86% | No |
| I-Carrageenan | 0.116 | 0.015 | 87% | No |
| K-Carrageenan | 0.118 | 0.017 | 86% | No |
| Xanthan Gum | 0.117 | 0.017 | 86% | No |
| Gum Arabic | 0.118 | 0.017 | 86% | No |
| HM Pectin (citrus/apple) | 0.116 | 0.017 | 86% | No |

TABLE 2-continued

Precipitation and total phycocyanin (PC) content before and after UHT thermal processing at pH 6.5.

| | Total PC (mg/mL) Before Heat | Total PC (mg/mL) After Heat | % Loss after heating | Precipitation |
|---|---|---|---|---|
| HM Pectin (sugar beet) | 0.112 | 0.015 | 87% | No |

Experiment 1.3

As the hydrocolloids on their own had no impact to color retention during thermal processing and protein aggregation is not a concern above a pH of 6.0, an experiment was conducted to determine the influence of a chelator, in particular $Na_2$ EDTA at 30 ppm on its own and in combination with the same seven hydrocolloids in experiment 1.2.

Aqueous solutions were prepared containing 7 wt % sucrose solution, EXBERRY® Shade Blue Powder 60000002 at 0.5 wt % (equating to 0.0117 wt % phycocyanin), $Na_2$ EDTA at 30 ppm, and seven hydrocolloids at a dosage level of 0.05 wt %. Trisodium citrate or citric acid was added to the final solution to reach a pH of 6.5. The beverages were processed to 135° C. for 6 seconds and filled at ambient temperature into sterile bottles as the product is low acid and the higher temperatures are needed to control for pathogens.

Total phycocyanin content was determined before and after processing and through 6 weeks in accelerated storage at 32° C. In a hotbox. The Yoshikawa & Belay (2008) method was modified as solution were measured at pH 6.5 vs. 6.0.

No aggregation or precipitation was observed after thermal processing at pH 6.5. The combination of $Na_2$ EDTA with λ-carrageenan, ι-carrageenan, and HM pectin (citrus/apple and sugar beet) had the best color retention post processing and through six weeks of storage at 32° C. The color of the beverage after thermal processing and through six weeks of storage remained blue for the $Na_2$ EDTA with λ-carrageenan, ι-carrageenan, HM sugar beet pectin, and HM citrus/apple pectin samples. Surprisingly, the color retention of EDTA with xanthan, gum arabic, and κ-carrageenan was worse than EDTA alone and the color was greenish blue.

Table 3 shows the total phycocyanin content for the control sample (no hydrocolloid or $Na_2$ EDTA), the addition of $Na_2$ EDTA at 30 ppm, and seven hydrocolloids at 0.05 wt % with 30 ppm $Na_2$ EDTA before and after processing and through six weeks of accelerated storage at 32° C.

TABLE 3

Total phycocyanin (PC) content before and after UHT thermal processing at pH 6.5 and through 6 weeks at 32° C. storage.

|  | Total PC (g/L) Before Heat | Total PC (g/L) After Heat | % Loss with heat | Total PC (g/L) 3 wk (32° C.) | Total PC (g/L) 6 wk (32° C.) | % Improvement vs. Control |
|---|---|---|---|---|---|---|
| Control | 0.117 | 0.016 | 86% | 0.012 | 0.010 |  |
| Na$_2$ EDTA | 0.118 | 0.034 | 71% | 0.028 | 0.024 | 145% |
| λ Carrageenan + Na$_2$ EDTA | 0.115 | 0.046 | 60% | 0.035 | 0.029 | 197% |
| ι Carrageenan + Na$_2$ EDTA | 0.118 | 0.040 | 66% | 0.029 | 0.025 | 152% |
| κ Carrageenan + Na$_2$ EDTA | 0.118 | 0.033 | 72% | 0.026 | 0.017 | 72% |
| Xanthan Gum + Na$_2$ EDTA | 0.120 | 0.029 | 76% | 0.018 | 0.016 | 59% |
| Gum Arabic + Na$_2$ EDTA | 0.118 | 0.032 | 73% | 0.024 | 0.021 | 113% |
| HM Pectin (citrus/apple) + Na$_2$ EDTA | 0.116 | 0.042 | 64% | 0.031 | 0.026 | 168% |
| HM Pectin (sugar beet) + Na$_2$ EDTA | 0.112 | 0.041 | 63% | 0.029 | 0.025 | 154% |

Experiment 1.4

To confirm findings from experiment 1.3, a follow-up experiment was conducted with EXBERRY® Shade Blue Powder 60000002 at 0.6 wt % (equating to 0.014 wt % phycocyanin) and sucrose at 7 wt % at pH 6.5 with combinations of Na$_2$ EDTA at 30 ppm and Ticaloid 750 λ-carrageenan (TIC GUMS) at 0.05 wt %. The solutions were analyzed by photometer before and after UHT processing (135° C.) and at week 3 and 6 in 32° C. hotbox storage. A total of four beverages were tested: control, λ-carrageenan, Na$_2$ EDTA, and λ-carrageenan with Na$_2$ EDTA at pH 6.5.

The results (see table 4) confirm that λ-carrageenan on its own will not improve phycocyanin color stability at neutral pH. Almost all the phycocyanin blue color in the control and λ-carrageenan samples were destroyed during thermal processing and the resulting color was grey. While λ-carrageenan on its own did not improve color retention, the combination of λ-carrageenan with Na$_2$ EDTA was the best performing sample after thermal processing and through 6 weeks storage at 32° C. The total phycocyanin content of the Na$_2$ EDTA and carrageenan sample was 134% higher than control sample (see table 4). Na$_2$ EDTA only sample was also significantly better than control with a 77% Improvement in total phycocyanin content over control.

FIG. 1 shows the change in absorbance before and after thermal processing of the four solutions tested.

TABLE 4

Total Phycocyanin content through 6 weeks 32° C. storage of UHT processed pH 6.5 beverage solutions

|  | Total Phycocyanin (mg/mL) content | | | | % |
|---|---|---|---|---|---|
|  | Before Heat | After Heat | Week 3 | Week 6 | Improvement from Control |
| Control | 0.143 | 0.017 | 0.020 | 0.014 |  |
| Na2 EDTA | 0.140 | 0.032 | 0.024 | 0.024 | 77% |
| λ-carrageenan | 0.136 | 0.017 | 0.014 | 0.011 | −22% |
| λ-carrageenan + Na2 EDTA | 0.133 | 0.047 | 0.037 | 0.032 | 134% |

Experiment 2

An experiment was conducted with EXBERRY® Shade Blue Powder 60000002 at 0.5 wt % (equating to 0.012 wt % phycocyanin), 7 wt % sucrose, and 15 wt % ethylalcohol. Na$_2$ EDTA at 30 ppm and/or Ticaloid 750 (TIC GUMS) λ-carrageenan at 0.05 wt % was added to determine if phycocyanin containing *spirulina* concentrate can be stabilized in alcohol containing beverages. The pH of the solutions were measured and the results were between 7-9. No acids or buffers were added to the solutions as pH measurements of alcohol containing solutions are not accurate.

All formulas were cold filled and the order of addition was as follows:
1) Dry blend λ-carrageenan with sugar and add to 50 wt % of total water (room temperature). Mix until fully hydrated (if used).
2) Add phycocyanin containing *spirulina* concentrate and mix until dissolved.
3) Add Na$_2$ EDTA (if used).
4) Add remaining water and alcohol.

The alcohol containing beverages were analyzed by photometer within 2 hours (T0) after batching and after 3 and 6 weeks of accelerated storage at 32° C.

Photometric measurements at T0, 3 weeks and 6 weeks are in Table. The results show that *spirulina* is stabilized by Na$_2$ EDTA and λ-carrageenan with Na$_2$ EDTA.

TABLE 5

Color Stability of Phycocyanin Containing Spirulina-Extract in 15 wt % Alcohol after 6 weeks at 32° C.
Total Phycocyanin (mg/mL) content in 15 wt % Alcohol Beverage through 6 weeks @ 32° C.
7 wt % Sucrose and 0.5 wt % EXBERRY® Shade Blue Powder 60000002

|  | Total Phycocyanin (mg/mL) | | | |
|---|---|---|---|---|
|  | T0 | 3 weeks | 6 weeks | % Loss |
| 15% ETOH Control | 0.092 | 0.032 | 0.024 | 74% |
| 15% ETOH λ-carrageenan 0.05 wt % | 0.090 | 0.032 | 0.023 | 74% |
| 15% ETOH Na$_2$ EDTA 30 ppm | 0.094 | 0.052 | 0.044 | 53% |
| 15% ETOH λ-carrageenan + Na$_2$ EDTA | 0.092 | 0.051 | 0.043 | 54% |

What is claimed is:

1. A liquid foodstuff, comprising:
   a. a *spirulina*-extract comprising phycocyanin
   b. at least one multi-sulphated carrageenan and/or pectin
   c. a chelating agent
   d. a solvent,
      i. wherein the amount of the at least one multi-sulphated carrageenan and/or the pectin is between 0.003 and 0.6 wt %, ii. wherein the weight ratio between the at least one multi-sulphated carrageenan and/or the pectin and the phycocyanin ranges between 1:1 and 100:1,
iii. wherein the chelating agent is present between 1-2000 ppm,
iv. wherein the solvent consists of water and optionally ethanol,
v. wherein the amount of the solvent ranges between 60-99 wt %,
vi. wherein the wt % are relative to the total weight of the liquid foodstuff.

2. The liquid foodstuff according to claim 1, wherein the solvent content is between 75-98 wt %.

3. The liquid foodstuff according to claim 1, wherein the solvent consists of water and optionally ethanol (ethylalcohol).

4. The liquid foodstuff according to claim 1, wherein the foodstuff contains between 0.1-20 wt % ethanol.

5. The liquid foodstuff according to claim 1, wherein the at least one multi-sulphated carrageenan is a non-degraded occurring carrageenan.

6. The liquid foodstuff according to claim 1, wherein the at least one multi-sulphated carrageenan is a hydrolyzed carrageenan.

7. The liquid foodstuff according to claim 1, wherein the at least one multi-sulphated carrageenan is selected from the group consisting of ι-carrageenan, δ-carrageenan, μ-carrageenan, θ-carrageenan, λ-carrageenan and ν-carrageenan, a hydrolysed product of ι-carrageenan, a hydrolysed product of δ-carrageenan, a hydrolysed product of μ-carrageenan, a hydrolysed product of θ-carrageenan, a hydrolysed product of λ-carrageenan and a hydrolysed product of ν-carrageenan.

8. The liquid foodstuff according to claim 1, wherein the at least one multi-sulphated carrageenan content of the liquid foodstuff is between 0.003-0.6 wt %.

9. The liquid foodstuff according to claim 1, wherein the pectin content of the liquid foodstuff is between 0.003-0.6 wt %.

10. The liquid foodstuff according to claim 1, wherein the phycocyanin content is between 0.003-0.07 wt %.

11. The liquid foodstuff according to claim 1, wherein the dissolved at least one multi-sulphated carrageenan and/or the pectin and the phycocyanin present within the liquid foodstuff at a weight ratio between 2:1-50:1.

12. The liquid foodstuff according to claim 1, wherein the chelating agent is selected from the group consisting of ethylene diamine tetra acetic acid and/or its Na, K, Ca salts and L-glutamic acid N,N-diacetic acid tetrasodium salt (GLDA).

13. The liquid foodstuff according to claim 1, wherein the chelating agent is ethylene diamine tetra acetic acid, which is present between 1-100 ppm.

14. The liquid foodstuff according to claim 13, wherein ethylene diamine tetra acetic acid and the phycocyanin are present within the liquid foodstuff at a weight ratio between 2:1-1:3000.

15. Process for preparing the liquid foodstuff according to claim 1, wherein the process comprises the steps:
a. adding and dissolving the at least one multi-sulphated carrageenan and/or the pectin in the water and mixing until the at least one multi-sulphated carrageenan and/or the pectin are dissolved, as determined by visual observation;
b. adding the phycocyanin, and mixing until dissolved at a pH of at least 5;
c. adding a chelating agent,
d. optionally adding a sweetener, flavor, vitamin, mineral, salt, buffer, juice, or other beverage components;
e. optionally adding other pigments;
f. adding the solvents to obtain the total volume;
g. treating the mixture of a)-f) by either thermally processing the liquid to at least 65° C. and filling it into a container; filling the liquid into a container and thermally processing the filled package to at least 100° C. or no thermal treatment and cold filling into a container and controlling by formulation (alcohol or water activity) addition of preservatives or high pressure.

16. The liquid foodstuff according to claim 1, wherein the at least one multi-sulphated carrageenan is selected from the group consisting of ι-carrageenan, λ-carrageenan, a hydrolysed product of ι-carrageenan, and a hydrolysed product of λ-carrageenan.

17. The liquid foodstuff according to claim 1, wherein the at least one multi-sulphated carrageenan is selected from the group consisting of λ-carrageenan and hydrolyzed λ-carrageenan.

* * * * *